Jan. 9, 1923.  1,441,984.
J. M. H. JACOBS.
FUSELAGE.
FILED SEPT. 20, 1913.
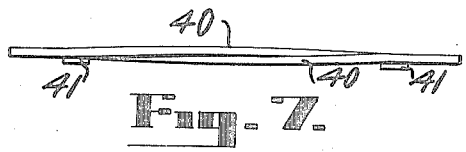
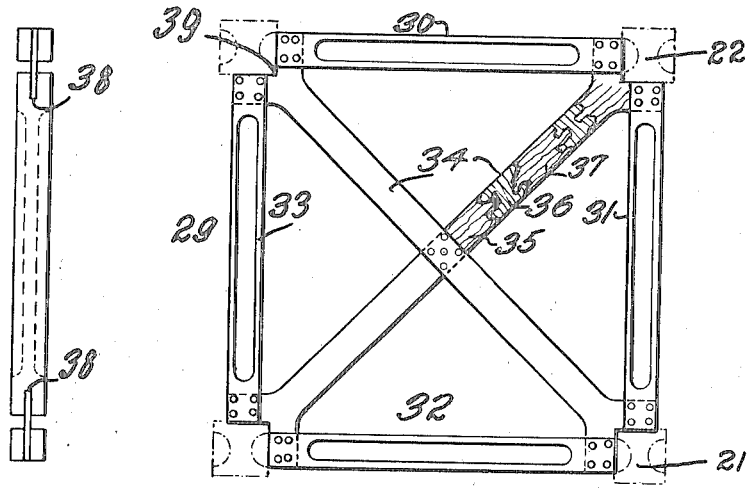
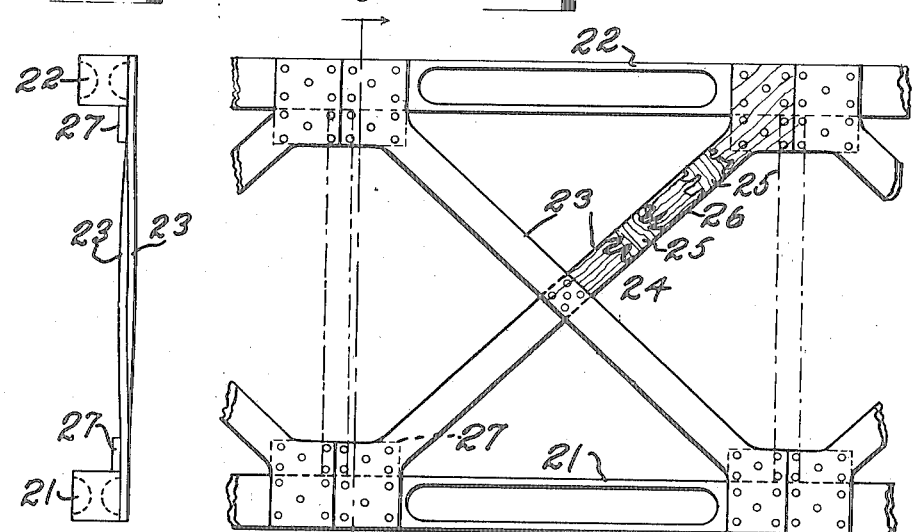

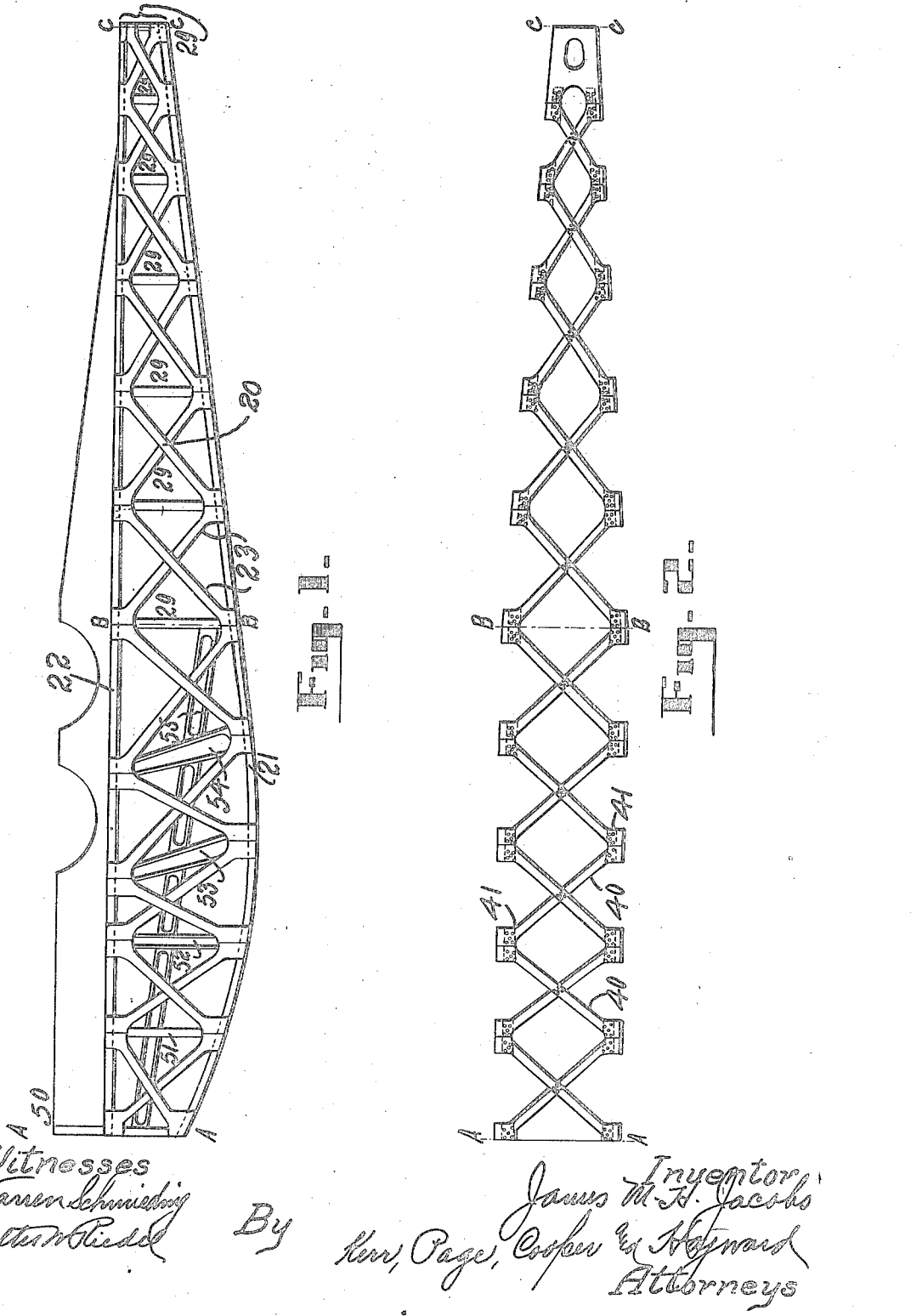

Patented Jan. 9, 1923.

1,441,984

UNITED STATES PATENT OFFICE.

JAMES M. H. JACOBS, OF DAYTON, OHIO, ASSIGNOR, BY MESNE ASSIGNMENTS, TO DAYTON-WRIGHT COMPANY, OF DAYTON, OHIO, A CORPORATION OF DELAWARE.

FUSELAGE.

Application filed September 20, 1918. Serial No. 254,953.

*To all whom it may concern:*

Be it known that I, JAMES M. H. JACOBS, a citizen of the United States of America, residing at Dayton, county of Montgomery, State of Ohio, have invented certain new and useful Improvements in Fuselages, of which the following is a full, clear, and exact description.

This invention relates to airplane fuselage construction, and has for its principal object the provision of a fuselage of improved construction which is readily adapted to the modern methods of interchangeable manufacture; in which the various sections composing the fuselage can be made separately and thereafter assembled, like parts being interchangeable.

It is a further object of the present invention to reduce the cost of manufacture by eliminating so far as possible all of the metal parts usually employed, such as the present wires and turnbuckles which are expensive both in first cost and in the cost of assembling in the fuselage.

Furthermore, it is an object of this invention to substitute for the bracing wires, bracing members of material other than metal, such as wood or composition material.

Other and further objects and advantages of the present invention will be apparent from the following description, reference being had to the drawings wherein one preferred embodiment of the present invention is clearly shown.

In the drawings:

Fig. 1 is a side elevation of a fuselage embodying the present invention;

Fig. 2 is a plan view of the bottom section of the fuselage as it would look if detached from the longerons.

Fig. 3 is an elevation of one of the transverse sections of the fuselage;

Fig. 4 is an end view of the section shown in Fig. 3;

Fig. 5 is a fragmentary elevational view of a portion of the side section of the fuselage on an enlarged scale to show the details of construction;

Fig. 6 is a sectional view taken on the line 6—6 of Fig. 5; and

Fig. 7 is an end view of the bottom section, showing the position of the bracing members relative to each other.

Referring to the drawing, 20 designates, as a whole, one of the side sections including longerons 21 and 22 which are connected together by cross bracing members 23, which may be of wood or some other material of a fibrous composition.

In the embodiment of the invention shown, particularly in detail in Fig. 5, each of the cross bracing members 23 is made of a plurality of layers or veneers, three layers 24, 25 and 26 being preferably used, the layers being so arranged that the grain of any layer runs substantially perpendicular to the grain of each adjacent layer. The ends of the bracing members 23 are offset and widened to permit of more securely connecting said members, as by nailing, to the longerons 21 and 22. Cooperating with the ends of the members 23, where they are attached to the longerons, and adapted to brace and strengthen the joints are plates 27, which tend to more firmly tie these members together. The members 23 cross each other as shown in Figs. 5 and 6, and may be tied together in any desired manner, as by means of the nails shown in Fig. 5. Both the side sections are structurally like the sections shown in Figs. 1, 5 and 6, and, when in assembled position are connected together by means of transverse sections 29.

The sections 29, which are located in that part of the fuselage included between the planes B—B and C—C, are the same in mechanical construction, differing only in so far as slight variations in size and configuration are necessary for adapting them to parts of the fuselage of varying section. Each transverse section 29 comprises struts 30, 31, 32 and 33 connected together by crossed tensioning rods 34, of multiply veneer, three plies 35, 36 and 37 being preferably used, the arrangement of the plies as to their grain being the same as in the members 23. The outer ends of the rods 34 are bifurcated to facilitate the attachment thereof to the struts 30, 31, 32 and 33, the ends of which are notched as at 38, to receive the furcations of the rods 34. The bifurcated ends of the rods 34, and the cooperating ends of the struts 30, 31, 32 and 33, are constructed to snugly engage the longerons 21 and 22 to permit of easy and firm attachment of the transverse sections to the longerons.

The bottom section shown in Fig. 2 consists of cross bracing members 40, which are similar in construction to the cross bracing members 23, shown in Fig. 5 and of plates 41 connecting the ends of the cross bracing members and tying them firmly together.

The top section of the fuselage is the same in structure as that portion of the bottom section which is included between lines B—B and C—C. Between lines A—A and B—B in Fig. 1, there is no top section, since the top of the fuselage must be open to provide space for the engine and controlling mechanism, and seats for the passengers.

The other parts of the fuselage generally consist of a front section 50 which may be of any desired construction. Struts 51, 52, 53 and 54, having their ends secured to the longerons 21 and 22, and to the connecting plates 27, are provided to add strength and rigidity to the structure. The fuselage may also include engine supporting beams 55, one of which is shown in Fig. 1, extending from line A—A to the line B—B, connected to the front section 50, struts 51, 52, 53 and 54, and to the transverse section 29 located at the line B—B.

It is obvious from the foregoing description that the fuselage embodying the present invention consists in the main of side sections, top and bottom sections, and transverse sections. Each of these sections can be readily assembled from its component parts without any relation to the other parts with which it is to cooperate, the construction of each of the sections being such as to lend itself readily to the modern methods of interchangeable manufacture. The sections of the fuselage which are few in number can be quickly assembled to form the complete whole. This operation being performed there are no bracing wires and turnbuckles to be fitted, since the bracing members are already included as members of the sections composing the fuselage. By eliminating the use of wire bracing members, of turnbuckles, and of other metallic connecting members, the higher initial cost of the metallic parts and the greater cost arising from assembling a fuselage containing them are reduced, the cost of manufacture of the fuselage as a whole being thus greatly reduced.

In addition to the saving in cost and the greater ease of manufacture arising from their use, the wooden bracing members possess a further and decided advantage over wire members, especially during aerial military operations. It has been found that a bracing member of wood may be shot through in a number of places before becoming sufficiently weakened to give away. Where a wire or cable bracing member is used, however, a single direct hit from a rifle or machine gun bullet will completely sever it. And, even where it is not hit a sufficiently direct blow to sever it, a glancing blow frequently causes such weakening that shortly breaking of the wire or cable results.

While the form of mechanism herein shown and described constitutes a preferred form of embodiment of the invention, it is to be understood that other forms might be adopted, all coming within the scope of the claims which follow.

What I claim is as follows:

1. In an airplane fuselage comprising longerons, a non-metallic diagonal brace having widened ends integral therewith for attachment directly to a longeron, without the use of intermediate joints.

2. In an airplane fuselage comprising longerons and struts, a tension member of multi-ply veneer, having its end adapted for direct attachment to a plurality of struts and bifurcated to cooperate with a longeron.

3. In an airplane, a fuselage comprising the combination with a plurality of longerons and struts; of wood diagonal members of multi-ply veneer, formed to size, and having ends attached to the longerons and struts so as to act as gussets for the joints between the longerons and struts.

4. In an airplane, a fuselage comprising the combination with a plurality of longerons and struts; of wood tension members of multi-ply veneer, formed to size and directly attached to the longerons and struts; and metallic plate members adapted to reinforce and brace the joints between the tension members and the longerons and struts.

5. In an airplane, a fuselage frame comprising a plurality of longerons held apart by struts, and diagonal tie members between the longerons and struts, said tie members being composed of multiple ply veneer and having wide flat ends for attachment to the longerons and struts and thereby form joints between the longerons and struts.

In testimony whereof I affix my signature.

JAMES M. H. JACOBS.

Witnesses:
F. O. CLEMENTS,
THOMAS MIDGLEY, Jr.